US006654150B1

(12) United States Patent
Rozzi

(10) Patent No.: US 6,654,150 B1
(45) Date of Patent: Nov. 25, 2003

(54) COLORIMETRIC CHARACTERIZATION OF SCANNED MEDIA USING SPECTRAL SCANNER AND BASIS SPECTRA MODELS

(75) Inventor: William A. Rozzi, West Lakeland Township, Washington County, MN (US)

(73) Assignee: Kodak Polychrome Graphics, Norwalk, CT (US)

( * ) Notice: Subject to any disclaimer, the term of this patent is extended or adjusted under 35 U.S.C. 154(b) by 0 days.

(21) Appl. No.: 09/342,983

(22) Filed: Jun. 29, 1999

(51) Int. Cl.$^7$ .................................................. G03F 3/08

(52) U.S. Cl. .......................... 358/520; 358/1.9; 358/518

(58) Field of Search ................................. 358/518, 519, 358/520, 504, 505, 474, 406, 1.9; 382/162, 167

(56) References Cited

U.S. PATENT DOCUMENTS

| | | | |
|---|---|---|---|
| 4,500,919 A | 2/1985 | Schreiber | 358/518 |
| 4,951,084 A | 8/1990 | von Stein et al. | 355/38 |
| 4,977,522 A | 12/1990 | David | 382/165 |
| 4,992,963 A | 2/1991 | Funt et al. | 250/226 |
| 5,003,500 A | 3/1991 | Gerber | 356/319 |
| 5,149,960 A | 9/1992 | Dunne et al. | 250/226 |
| 5,375,193 A | 12/1994 | Adams | 345/603 |
| 5,377,025 A | 12/1994 | Spaulding et al. | 358/518 |
| 5,463,480 A * | 10/1995 | MacDonald et al. | 358/520 |
| 5,543,940 A | 8/1996 | Sherman | 358/518 |
| 5,579,132 A | 11/1996 | Takahashi et al. | 358/527 |
| 6,088,095 A * | 7/2000 | Sharma | 358/504 |

FOREIGN PATENT DOCUMENTS

| | | |
|---|---|---|
| DE | 41 19 489 A | 11/1991 |
| EP | 0 378 448 | 7/1990 |
| EP | 1 001 610 A | 5/2000 |
| WO | WO 80 00753 A | 4/1980 |
| WO | WO 95 21502 A | 8/1995 |

OTHER PUBLICATIONS

Allen E, "Colorant Formulation and Shading," in Optical Radiation Measurements, vol. 2, Chapter 7, F. Grum and C.J. Bartelson, eds., Academic Press, New York, pp. 289–336 (1980).

Berns RS and Shyu MJ, "Colorimetric Characterization of a Desktop Drum Scanner Using a Spectral Mode," *J. Electronic Imaging* 4(4):360–372 (1995).

Berns RS, "Colorimetric Characterization of Sharp JX610 Desktop Scanner," Munsell Color Science Laboratory Technical Report, Rochester Institute of Technology, pp. 1–19 (1993).

Berns RS, "Spectral Modeling of a Dye Diffusion Thermal Transfer Printer," *J. Electronic Imaging* 2(4):359–370 (1993).

(List continued on next page.)

*Primary Examiner*—Mark Wallerson
(74) *Attorney, Agent, or Firm*—Shumaker & Sieffert, P.A.

(57) ABSTRACT

Modeling spectral characteristics of an image acquisition device. In one implementation, a computer system predicts the spectral reflectance or transmittance of a sample scanned by an image acquisition device, such as a graphic art scanner, by modeling the device. The sample is scanned by a scanner. The computer system searches for media coordinates in a colorant space corresponding to the sample. The media coordinates correspond to an estimated spectrum in a basis spectra model. The basis spectra model is derived by analyzing training color patches of the sample distributed throughout the gamut of the colorant set on the sample media. The estimated spectrum generates estimated digital values through a forward model of the scanner. The estimated digital values are compared to target digital values generated by the scanner to calculate an error value. The computer system repeats this process until a desired stopping criterion or criteria are met. The estimated spectrum corresponding to the final estimated digital values represents the reflectance spectrum of the sample as scanned by the scanner.

41 Claims, 9 Drawing Sheets

OTHER PUBLICATIONS

Chang W and Milch JR, "A Model for Stimulating the Photographic Development Process on Digital Images," in Camera and Input Scanner Systems, Proceedings SPIE—The International Society for Optical Engineering, vol. 1448, San Jose, California (1991) (Best copy available).

Clapper FR, "Color Reproduction," in The Theory of the Photographic Process, pp. 561–577 (1977).

Gorokhovskii YN, "Spectral Studies," The Focal Press, London & New York (1965).

Gschwind R., "Stimulating and Optimizing the Color Reproduction of Photographic Materials," Color Imaging Systems, Royal Photographic Society Symposium, Cambridge, Sep. 1986, M., Pointer, ed., pp. 4–10 (1987).

Hagan GT, "Resampling Methods for Image Manipulation," *The C Users Journal*, pp. 53–58 (1991).

Hamming RW, "Numerical Methods for Scientists and Engineers," 2nd Ed., pp. 657–676, Chapter 43, Optimization, Dover, New York (1973).

Hung P, "Colorimetric Calibration for Scanners and Media," *SPIE Camera and Input Scanner Systems* 1448:164–174 (1991).

Hunt RWG, "The Reproduction of Colour in Photography, Printing & Television," 4th Edition, Fountain Press, England, section 14.17, pp. 257–259 (1987).

Johnson T, "Methods for Characterizing Colour Scanners and Digital Cameras," *Displays* 16(4):183–191 (1996).

Kang HR, "Color Scanner Calibration," *J. Imaging Science and Technology* 36(2):162–170 (1992).

Malinowski ER and Howery DG, "Factor Analysis in Chemistry," John Wiley & Sons, New York, Chapters 1–5, pp. 1–117 (1980).

Mancill CE, "Digital Color Image Restoration," Ph.D. Thesis, University of Southern California, pp. 1–143 (1975).

Praefcke W, "Transform Coding of Reflectance Spectra Using Smooth Basis Vectors," *J. Imaging Science and Technology* 40(6):543–548 (1996).

Press WH et al., "Numerical Recipes in C," Second Edition, Cambridge University Press, pp. 412–430 (1992).

Rodriquez MA, "Producing Colorimetric Data from Densitometric Scans," *SPIE* 1913:413–418 (1993).

Saunders AE, "Fitting the Photographic Characteristic Curve: A Functional Equation Approach," *J. Photographic Science* 41:186–193 (1993).

Sharma G and Trussell HJ, "Set Theoretic Estimation of Color Scanner Characterization," *J. Electronic Imaging* 5(4):479–489 (1996).

Sigg F, "Errors in Measuring Halftone Dot Areas," *J. Applied Photographic Engineering* 9(1):27–32 (1983).

Stokes M et al., "Colorimetrically Quantified Visual Tolerances for Pictorial Images," Proc. 1992, vol. 2: Technical Assoc. Graphics Arts and Inter–Society Color Council, Milton Pearson, ed., RIT Research Corporation, Rochester, New York, pp. 757–777 (1992).

Tuijn C, "Input Calibration for Negative Originals," *SPIE* 2414:76–83 (1995).

Viggiano JA, "Modeling the Color of Multi–Colored Halftones," *Proc. TAGA*, pp. 44–62 (1990).

Weisberg S, "Applied Linear Regression," Chapter 8, p. 190ff, John Wiley & Sons, New York, pp. 1–51 and 182–263 (1980).

Chung, P., "Colorimetric Calibration for Scanners and Media" Proceedings of the SPIE, Feb. 27, 1991 XP000616908.

Finlayson, G D et al, "Constrained Least–Squares Regression in Color Spaces" Journal of Electronic Imaging, US, SPIE+IS&T, vol. 6, No. 4, Oct. 1, 1997, pp. 484–493, XP000722192.

* cited by examiner

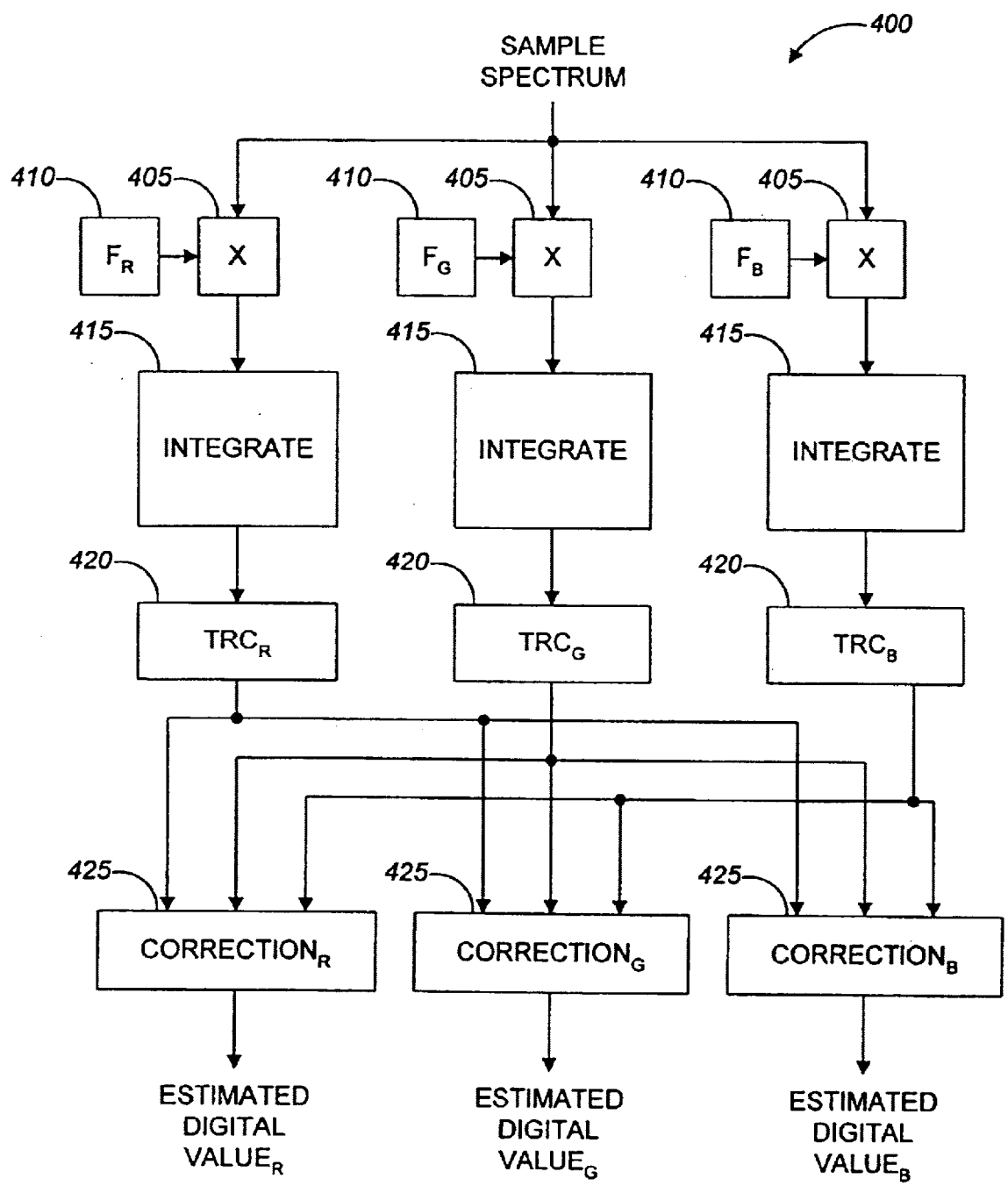

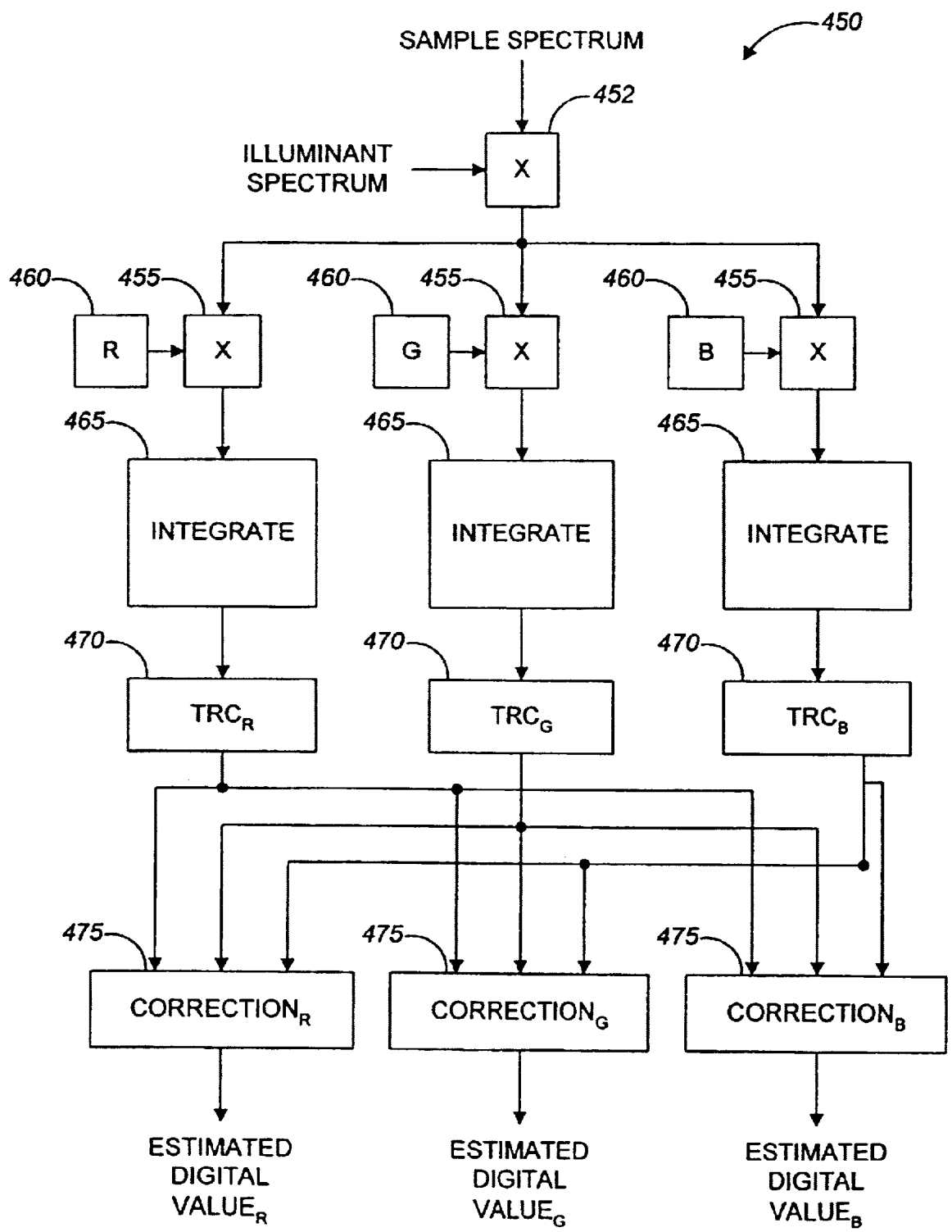

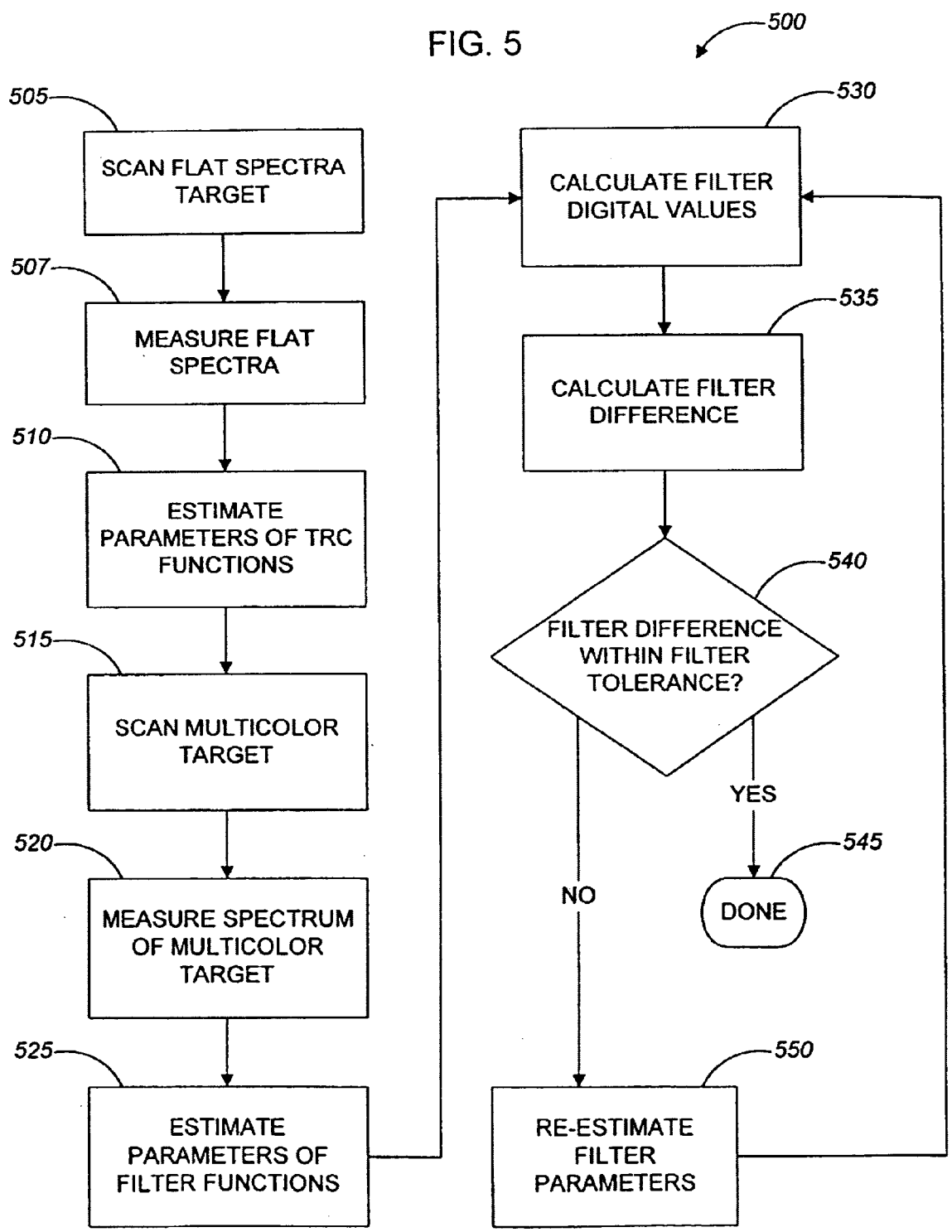

COLORIMETRIC CHARACTERIZATION OF SCANNED MEDIA USING SPECTRAL SCANNER AND BASIS SPECTRA MODELS

The present application is related to copending application Ser. No. 09/342,960, entitled "COLORIMETRIC CHARACTERIZATION OF SCANNED MEDIA USING SPECTRAL SCANNER AND MEDIA MODELS," to Rozzi, filed Jun. 29, 1999, and application Ser. No. 09/342,568, entitled "SPECTRAL MODELING OF PHOTOGRAPHIC PRINTING BASED ON DYE CONCENTRATION," to Rozzi, filed Jun. 29, 1999, both assigned to the same assignee as the present application, and each of which is incorporated herein by reference.

TECHNICAL FIELD

The invention relates to image acquisition devices such as graphics arts scanners, and more particularly to modeling the spectral behavior of an image acquisition device.

BACKGROUND

Scanners produce digital output values to represent the spectral reflectance of an input sample. A typical scanner illuminates a reflective target using a light source. The scanners sensors integrate light that reflects off the sample and passes through a set of spectrally selective filters. The integrated products may be modified by electronics and software to obtain digital output values.

The digital values generated by a scanner are dependent upon the filters and illuminant of the particular scanner and so are not device-independent values. To use the results of scanning a sample on a different device, device-independent values are desirable. Device-independent values include the spectral reflectance of the sample or other derived colorimetric values, such as CIE XYZ or CIE L*a*b* values.

In addition, different reflectance spectra can be perceived by the eye as the same color. Similarly, different spectra can produce the same digital values. This effect is called "metamerism." Metameric samples can produce different colorimetric response values when viewed or scanned under different viewing conditions. As a result, in modeling scanners, many different reflectance spectra can produce the same RGB values. To determine a more accurate estimate of a reflectance spectrum, it is desirable to limit the candidates to avoid metameric matches.

Furthermore, when the number of colorants used to form the gamut from which a sample is obtained is unknown, or when an appropriate physical model for the sample is not known, modeling the reflectance or colorimetric value of the sample becomes difficult. For example, a set of opaque pigmented paints on a substrate may be such a case. Without a limitation on the colorant space for modeling the sample, modeling the digital values of the scanner when scanning such a sample becomes correspondingly difficult.

SUMMARY

The invention provides methods and apparatus implementing a technique for modeling spectral characteristics of an image acquisition device. In one implementation, a computer system predicts the spectral reflectance or transmittance of a sample scanned by an image acquisition device, such as a graphic art scanner, by modeling the device. The sample is scanned by a scanner. The computer system searches for media coordinates in a colorant space corresponding to the sample. The media coordinates correspond to an estimated spectrum in a basis spectra model. The basis spectra model is derived by analyzing training color patches of the sample distributed throughout the gamut of the colorant set on the sample media. The estimated spectrum generates estimated digital values through a forward model of the scanner. The estimated digital values are compared to target digital values generated by the scanner to calculate an error value. The computer system repeats this process until a desired stopping criterion or criteria are met. The estimated spectrum corresponding to the final estimated digital values represents the reflectance spectrum of the sample as scanned by the scanner.

In general, in one aspect, the technique includes: (a) estimating media coordinates in a colorant space of a sample scanned by an image acquisition device, where the estimated media coordinates correspond to target digital values produced by the image acquisition device when scanning the sample; (b) converting the estimated media coordinates to an estimated spectrum using a basis spectra model corresponding to the sample; (c) estimating digital values by supplying the estimated spectrum to a forward model which models the image acquisition device; (d) identifying a digital error between the estimated digital values and the target digital values; (e) converting the estimated spectrum to estimated color space values; (f) converting the target digital values to target color space values; (g) identifying a color space error between the estimated color space values and the target color space values; (h) combining the digital error with the color space error to identify a composite error; and (i) if a stopping criterion has not been met, searching the colorant space for media coordinates according to the composite error and repeating steps (b) through (i) until the stopping criterion has been met.

Advantages that may be seen in implementations of the invention include one or more of the following: the final predicted spectrum is a device-independent and viewing-condition-independent approximation of the spectral reflectance of the sample; the model of the scanner can be used to predict the scanner's output without actually scanning which is useful for experimental purposes; the predicted spectrum is modeled without a supplied media model corresponding to the sample; the number of basis vectors in the basis spectra model is determined automatically without user intervention; constrained minimization searching reduces the potential for metameric matches; and further reduction in metameric matches preferably may be achieved by using a composite error to drive the search.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A is a block diagram of a forward scanner model.

FIG. 4B is a flow chart of an alternative implementation of a forward scanner model.

FIG. 5 is a flow chart of estimating parameters for the inverse model.

Like reference numbers and designations in the various drawings indicate like elements.

DETAILED DESCRIPTION

Figure 1:
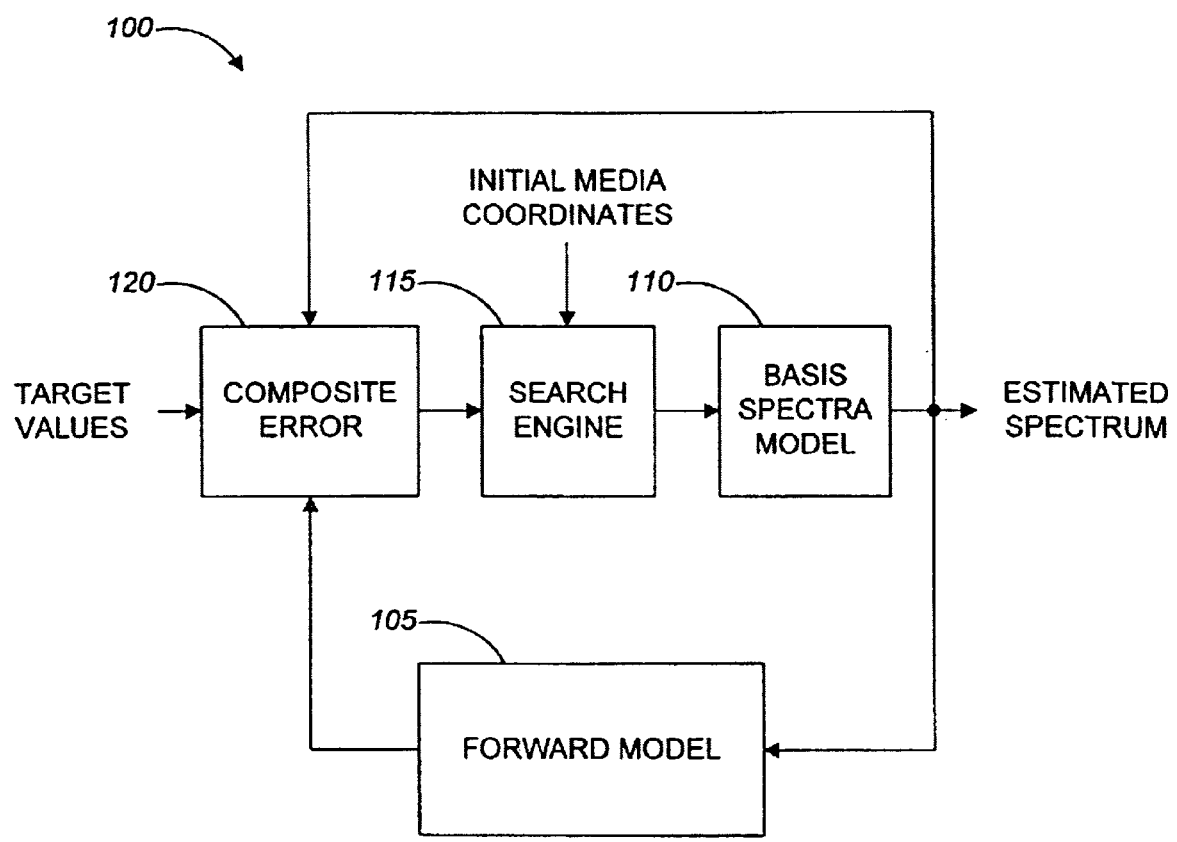
FIG. 1 is a block diagram of an inverse model according to the invention.

In one implementation of the invention, a computer system models the calorimetric behavior of an image acquisition device such as a graphics arts scanner when scanning a sample (i.e., acquiring and processing image information based on spectral energy received from the illuminated sample). As shown in FIG. 1, the computer system employs an inverse model 100 which converts target digital values from the scanner to an estimated spectrum. The scanner has at least one output channel (e.g., R, G, and B) and generates target digital values for each channel. The estimated spectrum can be an estimate of spectral reflectance or spectral transmittance, depending upon the application. The inverse model 100 includes a forward model 105 which estimates digital values for each output channel of the scanner based on a supplied spectrum. The inverse model also includes a basis spectra model 110. The basis spectra model is derived to represent the gamut of the colorants on the media of the sample and translates media coordinates into an estimated spectrum. The media modeled by the basis spectra model can be for reflective or transmissive media. The inverse model 100 repeatedly estimates coordinates in a colorant space corresponding to the sample using a search engine 115. The search engine 115 searches in the colorant space based on a composite error 120. The inverse model derives the composite error from target digital values from the scanner, estimated digital values from the forward model 105, and the estimated spectrum. The inverse model 100 converts estimated media coordinates to produce the estimated spectrum through the basis spectra model 110 and supplies the estimated spectrum to the forward model 105. The forward model 105 converts the supplied spectrum to estimated digital values. The inverse model 100 compares the estimated digital values to the target digital values and compares color space values based on the estimated spectrum and the target digital values to find the composite error 120. If a stopping criterion or criteria have not been met, the search engine 115 searches for new media coordinates based on that composite error 120. The stopping criterion can be a specified tolerance for the composite error 120, or alternatively can be a different criterion such as a number of iterations. When the stopping criterion has been met, the inverse model 100 recognizes that spectrum as the predicted spectrum which sufficiently corresponds to the reflective spectrum of the sample.

Figure 2:
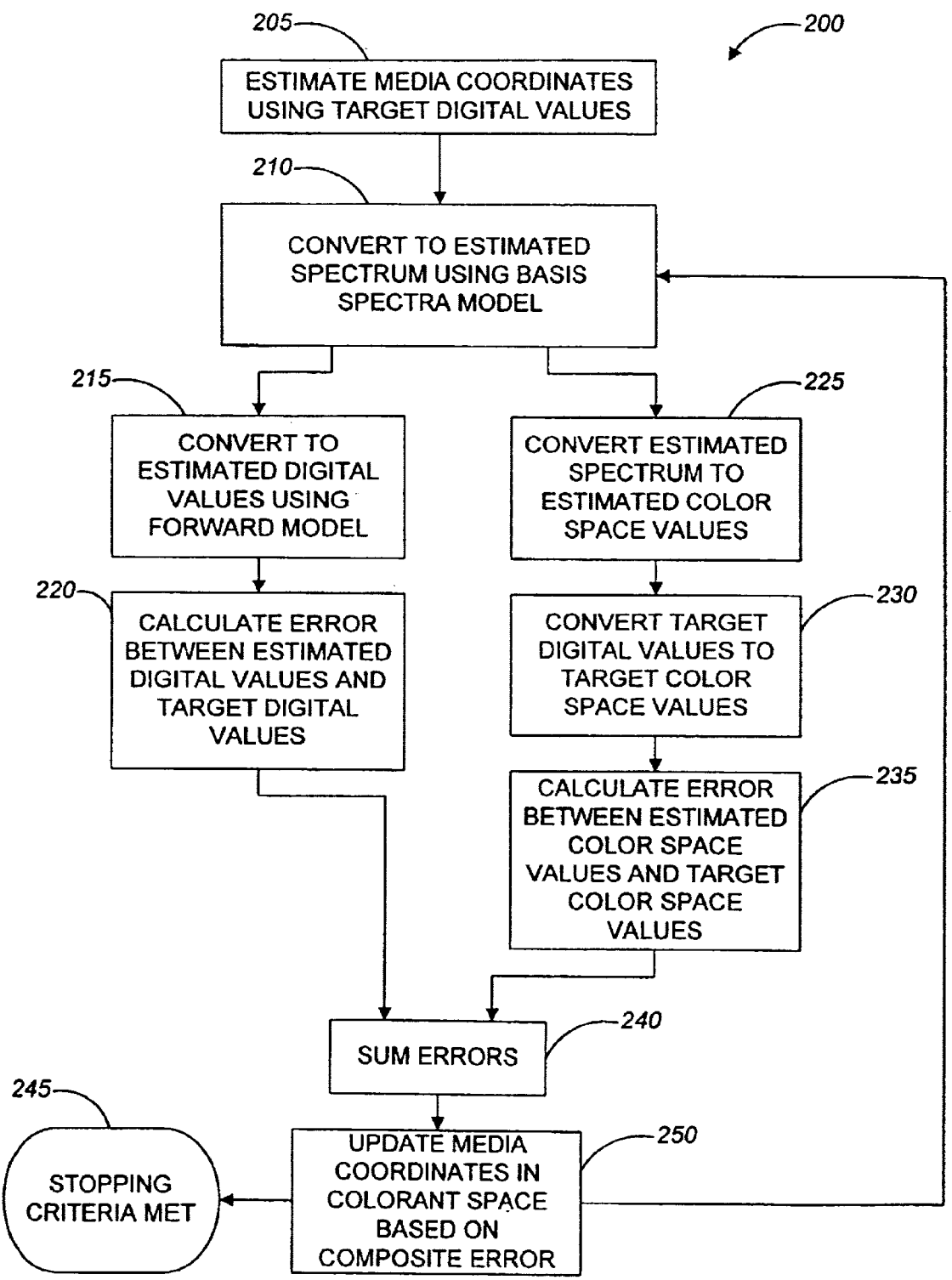
FIG. 2 is a flow chart of the inverse model.

As shown in FIG. 2, in a method 200 of modeling the spectral reflectance of a sample as scanned by a scanner by identifying a predicted spectrum, a computer system estimates media coordinates within a colorant space of a basis spectra model corresponding to the sample (step 205). The computer system estimates the media coordinates based on target digital Values produced by the scanner (typically red, green, and blue, or "RGB", color space digital values). The estimated media coordinates are estimated to correspond to a spectrum which produces the target digital values. The estimation of the initial media coordinates is not critical. The inverse model should converge to an acceptable solution even for "poor" initial estimates. The possibility of converging to an incorrect, metameric match is reduced, however, when the initial estimates are close to their final values. One process for estimating initial media coordinates uses constant initial values from the center of the valid ranges for the media coordinates. An alternative process uses the target RGB values from the scanner or their inverted values as the initial estimates. For example, in one implementation the basis spectra model represents media with cyan, magenta, and yellow dyes and all media coordinates and target device values are normalized to a range of zero to one. In this case, initial media coordinates can be computed as the inverted target RGB values:

$$C_0 = 1 - R_{tgt}$$

$$M_0 = 1 - G_{tgt}$$

$$Y_0 = 1 - B_{tgt}$$

where $C_0$, $M_0$, and $Y_0$ are the initial estimated media coordinates and $R_{tgt}$, $G_{tgt}$, and $B_{tgt}$ are the target RGB values. Other processes for estimating the initial media coordinates are possible and should be obvious to one of ordinary skill in the art.

The computer system converts the estimated media coordinates to an estimated spectrum using the basis spectra model (step 210). The basis spectra model is a weighted summation of a set of basis vectors:

$$S(\lambda) = \sum_{i=1}^{N} w_i \varphi_i(\lambda)$$

where $S(\lambda)$ is the reflectance (or transmittance) spectrum of the sample, $\{\varphi_i(\lambda)\}$ are the reflectance (transmittance) basis vectors, $\{w_i\}$ are the weights, and N is the number of basis spectra. The weights represent the estimated media coordinates. The computer system preferably derives the basis spectra vectors and the number of vectors from a factor analysis of a set of training color patches produced by the media under study. The factor analysis is of the reflectance or density spectra of the training samples, which are a reasonable sampling of the color gamut to be modeled. A preferred factor analysis is described by E. R. Malinowski and D. G. Howery in "Factor Analysis in Chemistry", John Wiley & Sons, New York, 1980, the disclosure of which is incorporated herein by reference. Preferably, the eigenvectors which have corresponding eigenvalues greater than unity are the basis vectors. By limiting the number of basis vectors in the basis spectra model, the number of dimensions of the colorant space represented by the basis vectors is similarly limited. Accordingly, searching the colorant space for media coordinates, as described below, is simpler than with a high or unrestricted number of dimensions, reducing problems with dimensionality. The computer system verifies the resulting basis set by comparing each training spectrum with a corresponding reconstruction from a weighted combination of basis vectors of that training spectrum. If the reconstruction error is larger than a reconstruction tolerance, the unused eigenvector with the largest eigenvalue is added to the basis vector set.

Factor analysis is principal component analysis, preferably followed by an optional rotation of retained eigenvectors. The first eigenvector accounts for the most data variance. Subsequent eigenvectors account for monotonically decreasing levels of variance. The retained eigenvectors may not closely resemble real colorants. To obtain more representative basis vectors, the computer system transforms the retained eigenvectors. Varimax rotation is a preferred transformation which distributes the data variance more equally among the basis vectors.

Basis spectra models differ from other media models in that the media coordinates of basis spectra models, the weighting factors, may be bipolar. In addition, valid ranges for the weights are not deduced from physical constraints. Accordingly, basis spectra models have more opportunities for metameric matches (i.e., different values which appear to produce the same color to a particular viewer) when using an error metric based on a tristimulus color space, such as XYZ or RGB. To avoid such metamerism, the basis weights are constrained, but these constraints are derived rather than deduced, as the constraints are in physically motivated media models. To set the constraints, the computer system uses the weight ranges observed when reconstructing the training data. The observed ranges are preferably expanded by some safety margin to allow for test vectors outside the gamut of the training data.

Thus, the basis spectra model is specific to the media of the sample. The computer system selects media coordinates which are within the colorant space of the basis spectra model. Accordingly, the basis spectra model limits the spectra under consideration and thus limits the resulting metamerism in estimating the media coordinates. The basis spectra model reduces the metamerism problem by constraining the coordinates to eliminate colors which are not realizable on the sample media. In addition, the media colorant space has fewer dimensions than a spectral measurement and so searching over the media colorant space is more efficient.

Returning to FIG. 2, the computer system converts the estimated spectrum to estimated digital values using a forward model of the scanner (step 215). The computer system supplies the estimated spectrum to the forward model and the forward model predicts digital values the scanner would produce for the supplied spectrum in the device-dependent coordinate space of the scanner. The forward model includes filter functions and channel-independent tone reproduction curves ("TRCs") which are specific to the scanner. The forward model optionally includes correction functions to represent channel interaction unaccounted for in other sections of the forward model. The forward model is described in more detail below.

The computer system calculates a digital error between the target digital values and the estimated digital values (step 220). The computer system preferably calculates the Euclidean distance between the two sets of digital values. The digital error can be an error value including the digital values for all the channels, or an error value particular to each digital value. Alternatively, the calculation of the digital error may vary for each digital value.

To further reduce metamerism, the computer system determines a color space error. The computer system converts the estimated spectrum to color space values (step 225). The color space values can be CIE L*a*b* (or "LAB") values, a standard color space system. The computer system also converts the target digital values to color space values (step 230). The color space error is the difference between the LAB values from the estimated spectrum and the target LAB values (step 235). The composite error is based on the color space error and the digital error, as described below. If a specified stopping criterion has been met, the computer system outputs the estimated spectrum which produced the current estimated digital values as the predicted spectrum (step 245). The stopping criterion can be an error tolerance. In one alternative implementation, each value has a different tolerance. In such an implementation, the estimated spectrum is the predicted spectrum when each of the errors is less than the corresponding tolerance. If the stopping criterion has not been met, the computer system "searches" the colorant space of the basis spectra model by updating the current media coordinates based on the error value to determine new media coordinates (step 250). The search engine preferably maintains statistics of the estimated media coordinates and errors to determine an "error surface" model. The search engine uses the accumulated error surface model and the current error to determine new estimated media coordinates. The search engine preferably uses a numerical minimization technique such as Powell's method or BFGS described by W. H. Press et al. in "Numerical Recipes in C", 2d ed., Cambridge University Press, 1992. This technique is further constrained so that only media coordinates within bounds corresponding to the basis spectra model are identified. Thus, these constraints restrict the search process, reducing metamerism. The computer system passes the new media coordinates through the basis spectra model (step 210) and repeats these steps until the stopping criterion has been met.

Figure 3:
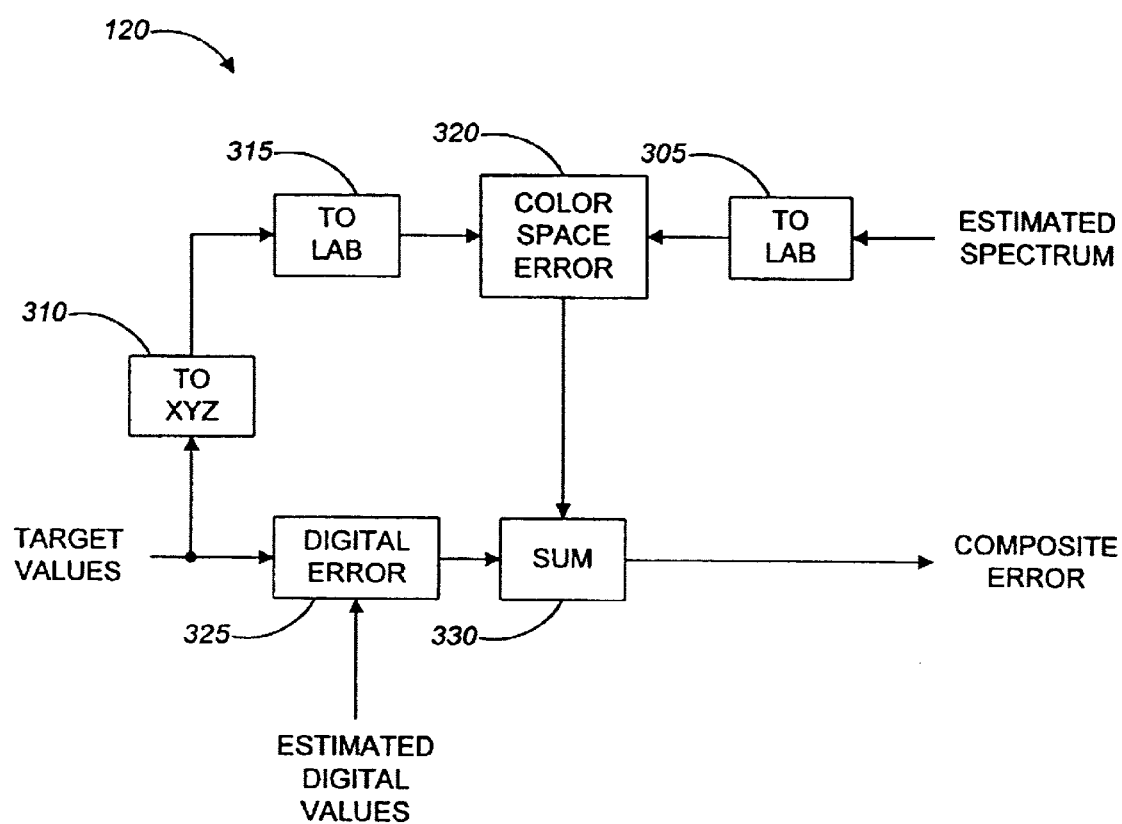
FIG. 3 is a block diagram of estimating a composite error in the inverse model.

As shown in FIG. 3, to calculate the composite error (120 in FIG. 1), the computer system converts the estimated spectrum to color space values, such as LAB values 305. As noted above, the computer system also converts the target digital values to color space values. The computer system converts the target digital values to target XYZ values 310 preferably using X, Y, and Z regression equations. The computer system preferably uses stepwise regression to derive three separate equations that predict X, Y, and Z values from R, G, and B values, where the R, G, and B values are preferably averages:

$$X=\rho_X(R, G, B)$$

$$Y=\rho_Y(R, G, B)$$

$$Z=\rho_Z(R, G, B)$$

The computer system averages the RGB values within the center of each scanned color patch. Stepwise regression equations are discussed in S. Weisberg in "Applied Linear Regression" Chapter 8, p190ff, John Wiley and Sons, New York 1980, the disclosure of which is incorporated by reference, as further described below. The regression equations predict XYZ values for a particular viewing condition. While the color space error is preferably measured under the same viewing conditions, the resulting predicted spectrum is generally applicable to other viewing conditions as well.

The computer system converts the target XYZ values to target LAB values 315. The color space error is the difference between the LAB values from the estimated spectrum and the target LAB values 320. The difference is preferably calculated as the Euclidean distance or weighted Euclidean distance between estimated and target LAB values. By including XYZ values in the error calculation, each patch is effectively measured through RGB and XYZ filters, reducing the likelihood of metameric matches.

The computer system calculates the digital error 325 as the distance between the target digital values and the estimated digital values from the forward model. The computer system combines 330, such as by summation, the color space error 320 and the digital error 325 to calculate the composite error.

As shown in FIG. 4A, in a forward model 400, the computer system receives a sample spectrum. The sample spectrum is multiplied 405 by filter functions 410 corresponding to each channel of the scanner. In an implementation where the scanner has red, green, and blue channels, the forward model includes three filter functions, as shown in FIG. 4A. Each filter function 410 represents the product of a filter transmittance spectrum and an illuminant spectrum. The filter transmittance and illuminant spectra need not be separately determined. Alternatively, the illuminant spectrum can be provided or measured directly, as described below. The filter functions 410 are estimated from training samples, as described below. The products of each filter function and the sample spectrum are integrated 415 over at least one wavelength, such as the visible wavelengths, preferably approximately 380 to 730 nanometers. The integrator outputs thus may be expressed as:

$$r = \int S(\lambda) R(\lambda) I(\lambda) d\lambda$$

$$g = \int S(\lambda) R(\lambda) I(\lambda) d\lambda$$

$$b = \int S(\lambda) R(\lambda) I(\lambda) d\lambda$$

where r, g, and b are the integrator outputs; S is the sample spectrum; R, G, and B are the filter transmittance spectra; I is the illuminant spectrum; and $\lambda$ represents wavelength. As noted above, R, G, B, and I may be expressed as filter functions:

$$F_R(\lambda) = R(\lambda) I(\lambda)$$

$$F_G(\lambda) = G(\lambda) I(\lambda)$$

$$F_B(\lambda) = B(\lambda) I(\lambda)$$

The forward model 400 converts the integrator outputs to digital values using tone reproduction curves ("TRC") 420. The TRCs 420 are one-dimensional transformation functions, such as gain-offset gamma functions, and may be expressed as:

$$d_r = T_R[r] = [k_{gain.r} r + k_{offset.r}]^{\gamma_r}$$

$$d_g = T_G[g] = [k_{gain.g} g + k_{offset.g}]^{\gamma_g}$$

$$d_b = T_B[b] = [k_{gain.b} b + k_{offset.b}]^{\gamma_b}$$

The forward model 400 may optionally adjust these digital values from the TRCs 420 using correction functions 425, as described below.

FIG. 4B shows an implementation of a forward model 450 where the illuminant spectrum is known or measured directly. The operation of the forward model 450 is generally similar to that of the forward model 400 shown in FIG. 4A and described above. The received sample spectrum is multiplied 452 by the supplied illuminant spectrum. This product is multiplied 455 by filter transmittance spectra 460 corresponding to each channel of the scanner. In an implementation where the scanner has red, green, and blue channels, the forward model includes three filter transmittance spectra, as shown in FIG. 4B. The filter transmittance spectra 460 are estimated from training samples using the known illuminant spectrum. Thus, rather than estimating filter functions which represent the products of filter transmittance spectra and an illuminant spectrum as in the forward model 400 of FIG. 4A, the filter transmittance spectra 460 are estimated directly. As above, the resulting products are integrated 465 over the visible wavelengths, preferably approximately 380 to 730 nanometers, and the integrator outputs are converted to digital values TRCs 470. The forward model 450 may optionally adjust these digital values from the TRCs 470 using correction functions 475, as described below.

Before the computer system uses the inverse model to predict the spectral reflectance of the sample, the computer system estimates the parameters of functions within the forward model. As shown in FIG. 5, in a process 500 of estimating parameters, a target having a neutral step wedge is scanned to produce flat sample values (step 505). The neutral step wedge target preferably has reflectance spectra which are substantially flat and a density range which encompasses the density range of most imagery to be digitized by the scanner. The spectra of the target are also measured with a spectrophotometer to produce flat sample spectra (step 507). The spectrophotometer is either reflective or transmissive depending upon the nature of the media.

Figure 6:
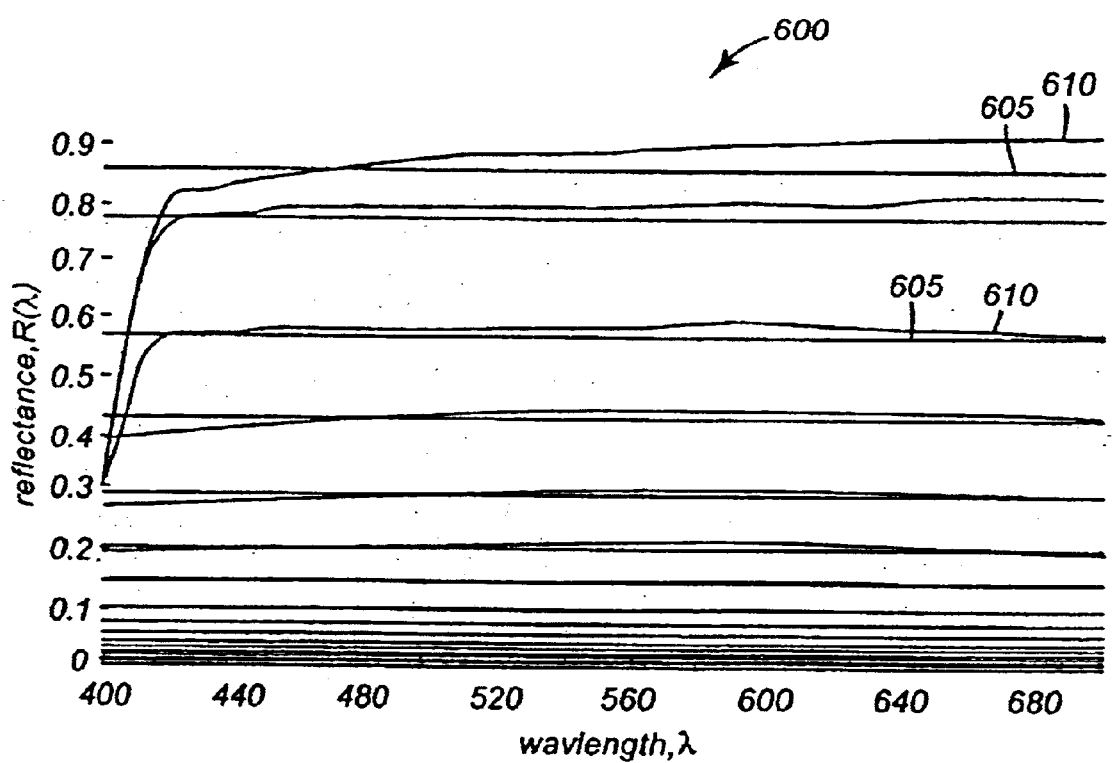
FIG. 6 is a graph of the spectral reflectance of a target with a neutral color wedge

An example of reflectance spectra 600 from a preferred flat spectra target is shown in FIG. 6. The flat horizontal lines 605 are average spectral values for the measured values 610 for each patch over the visible wavelengths (approximately 400 to 700 nm).

For the i-th sample in the flat spectra target, the corresponding measured reflectance spectrum $S_i$ is approximated by a constant, $c_i$, computed by averaging the reflectance spectrum $S_i$ over the visible wavelengths. Accordingly, the integrals described above can be rewritten as (taking r as an example):

$$r_i = c_i \int F_R(\lambda) d\lambda$$

The integral in this equation is also a constant, $\Phi$, independent of the sample spectrum $S_i$. Therefore the TRC for r can be rewritten as:

$$d_r^i = T_R[r_i] = T_R[c_i \Phi] = [k_{gain.r} c_i \Phi + k_{offset.r}]^{\gamma_r}$$

By defining a new gain parameter $k'_{gain.r} = k_{gain.r} \Phi$, then $$d_r^i = T'_R[c_i] = [k'_{gain.r} c_i + k_{offset.r}]^{\gamma_r}$$

Because $S_i$ is substantially flat, this equation does not depend on wavelength and so the TRC function can be sampled at the constant $c_i$. The resulting samples preferably are used to estimate the parameters of the one-dimensional transformation functions with a constrained minimization technique using the flat sample values (step 510). This estimation can be an iterative process which repeats until a specified criterion has been met. When a one-dimensional transformation function is a gain-offset-gamma function, the parameter are gain, offset, and gamma. The gain parameter may be too high by a factor of $\Phi$, but this discrepancy may be compensated for by an implicit scale factor introduced when estimating filter function parameters. The TRC parameters are preferably estimated on a channel-independent basis.

To estimate the filter parameters of the filter functions, a second multicolor target including color samples that span the gamut of a particular printing device is scanned to produce multicolor sample values (step 515). Reflectance spectra of the multicolor target are also measured to produce multicolor sample spectra (step 520). The filter functions are preferably approximated in the forward model by Gaussian functions with three parameters: mean, standard deviation, and amplitude. Alternatively, other functions may be used, such as cubic splines, blobs, summed Gaussians, delta functions, or a combination thereof. For example, for a fluorescent illuminant, a combination of delta and Gaussian functions is preferred. An eight-step sampling of RGB color space (a total of 512 samples) converted to CMYK (cyan, magenta, yellow, and black) color space with square-law gray component replacement may produce sufficient accuracy. Alternatively, fewer samples may be used. Given the estimated TRCs, as described above, a constrained minimization technique is preferably used to estimate the filter parameters (step 525). The estimated filter parameters minimize the average color difference between values produced by scanning the multicolor target and values predicted using the estimated filter functions and the measured spectra of the multicolor target. The computer system calculates filter digital values based on the measured spectra of the multicolor target using the forward model and the estimated TRC and filter functions (step 530). In this estimation, the correction functions preferably are not used. The system calculates a filter difference by comparing the filter digital values to target values from scanning the multicolor target (step 535). The filter difference is an average color difference, preferably calculated by finding the average Euclidean distance between paired values. If a filter stopping criterion is met, such as when the filter difference is within a specified filter tolerance (step 540), estimating the filter parameters is complete (step 545). If not, such as when the filter difference is outside the filter tolerance (step 540), the computer system re-estimates the filter functions (step 550) and repeats the above steps 530 to 550. As with the TRCs, the filter parameters are preferably estimated on a channel-independent basis.

Figure 7A:
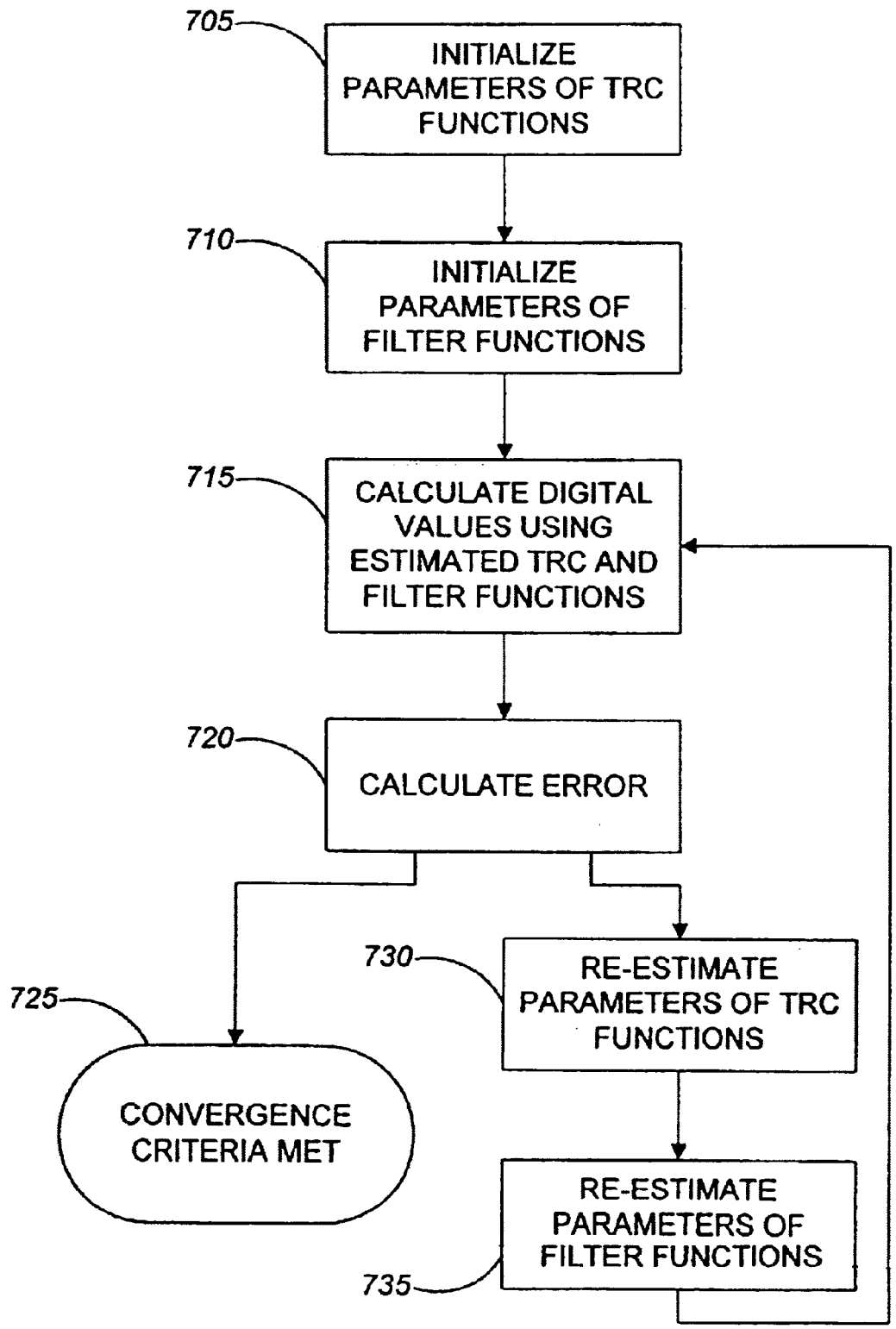
FIG. 7A is a flow chart of estimating parameters for the inverse model.

In an alternative implementation, the TRC and filter function parameters are estimated repeatedly in a construction process until a convergence criterion is met. This convergence criterion can be met when a construction difference is within a construction tolerance, or, alternatively, after a specified number of iterations. As shown in FIG. 7A, in an iterative parameter estimation process 700, the TRC parameters are estimated as described above (step 705). The TRC functions can alternatively be initialized as linear functions. Filter parameters are estimated as described above, including scanning and measuring spectra of a multicolor target (step 710). The filter functions can alternatively be initialized as conventional R, G, and B filter functions, such as wide band Gaussians centered at 450, 550, and 650 nanometers. The computer system estimates construction digital values with the forward model using the estimated TRC functions and filter functions based on measured spectra of the multicolor target (step 715). A construction difference between these construction digital values and the digital values from scanning the multicolor target is calculated (step 720). If the convergence criterion has been met, such as when the construction difference is within the construction tolerance, the computer system is ready to model the scanner with an actual sample (step 725). If not, such as when the construction in difference is outside the construction tolerance, the computer system re-estimates the TRC and filter function parameters. The estimated filter function parameters are used to re-estimate the TRC parameters (step 730). The filter functions are also re-estimated using the re-estimated TRC functions, as described above (step 735). The re-estimated TRC and filter functions are used to calculate new construction digital values (step 715). The process repeats until the construction difference is within the construction tolerance. Alternatively, the computer system also uses correction equations, such as stepwise multiple linear regression functions, to further refine the forward model predictions.

In another alternative implementation where the TRC and filter function parameters are estimated repeatedly in a construction process until a convergence criterion is met, the TRC parameters and filter function parameters are derived from training targets measured with a spectrophotometer.

Figure 7B:
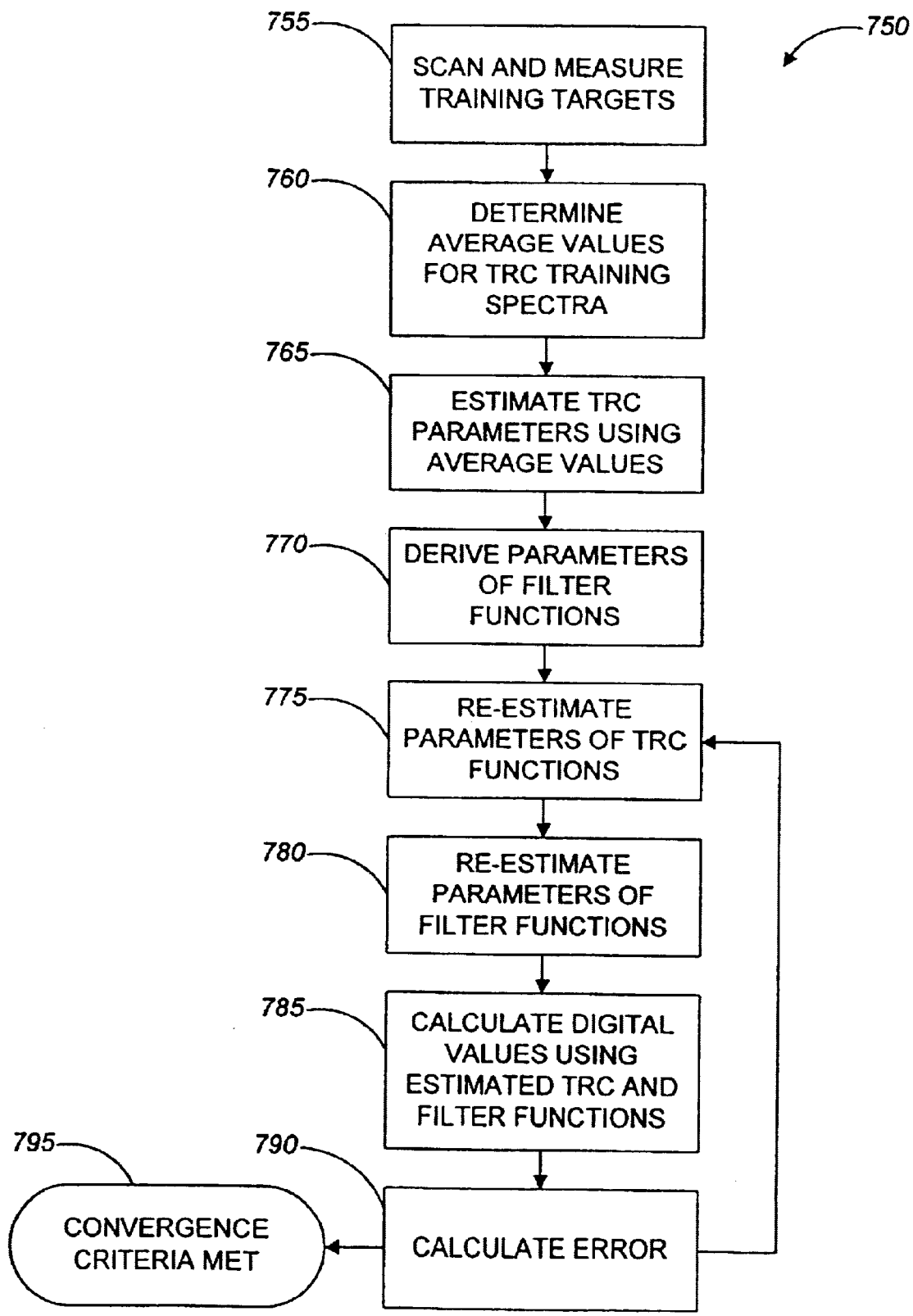
FIG. 7B is a flow chart of estimating parameters for the inverse model.

The convergence criterion can be met when a construction difference is within a construction tolerance, or, alternatively, after a specified number of iterations. As shown in FIG. 7B, in an iterative parameter estimation process 750, TRC and filter function training targets, such as the flat and multicolor targets described above, are scanned and measured with a spectrophotometer (step 755). The computer system determines average (constant) values for the TRC training spectra (step 760). The computer system. estimates the TRC parameters using the constant values for the TRC training spectra (step 765). The computer system preferably estimates the TRC parameters using a constrained minimization technique. The computer system derives the filter parameters using the measured training samples and constrained minimization (step 770). The computer system replaces the constant TRC training spectra with the actual spectral measurements and re-estimates the TRC parameters (step 775). The computer system uses the re-estimated TRC parameters to re-estimate the filter parameters (step 780). The computer system estimates construction digital values with the forward model using the estimated TRC functions and filter functions based on the measured spectra of the multicolor target (step 785). A difference between these construction digital values and the digital values from scanning the target is calculated (step 790). If the convergence criterion has been met, such as when the construction difference is within the construction tolerance, the computer system is ready to model the scanner with an actual sample (step 795). If not, such as when the construction difference is outside the construction tolerance, the computer system re-estimates the TRC and filter function parameters in steps 775 and 780, and the process repeats until the difference is within the construction tolerance. Alternatively, the computer system also uses correction equations, such as stepwise multiple linear regression functions, to further refine the forward model predictions.

Optional correction functions (shown as functions 425 in FIG. 4A) are preferably used to refine the estimation of the forward model. While the actual physical process is not clearly understood, there may be channel interaction which the filter functions 410 and TRCs 420 do not reflect. The correction functions 425 represent this channel interaction. The correction functions are preferably multidimensional regression functions. The preferred regression correction functions may be formed as a linear combination of a set of predictor functions which are themselves functions of the TRC output values. Considering the red channel, the regression function may be written as:

$$d'_r = \sum_{i=1}^{N_{pred}} \beta_i f_i(d_r, d_g, d_b) + \beta_0$$

where $d'_r$ is the corrected model output; $d_r$, $d_g$, and $d_b$ are the TRC output values; $f_i(d_r, d_g, d_b)$ is the i-th predictor function; $\beta_i$ is the i-th regression parameter; and $N_{pred}$ is the number of predictor functions in the regression. The specification of the form of the predictor functions is subjective. For example, when modeling RGB scanner output, the predictor functions could be selected to be:

$$f_1(d_r, d_g, d_b) = d_r$$

$$f_2(d_r, d_g, d_b) = d_g$$

$$f_3(d_r, d_g, d_b) = d_b$$

$$f_4(d_r, d_g, d_b) = d_r^2$$

$f_5(d_r, d_g, d_b) = d_r d_g$ $f_6(d_r, d_g, d_b) = d_r d_b$ $f_7(d_r, d_g, d_b) = d_g^2$ $f_8(d_r, d_g, d_b) = d_g d_b$ $f_9(d_r, d_g, d_b) = d_b^2$

Given a specification of the predictor functions, the regression parameters $\{\beta_i\}$ can be determined via a standard stepwise regression process such as that described by S. Weisberg in "Applied Linear Regression" Chapter 8, p190ff, John Wiley and Sons, New York 1980, the disclosure of which is incorporated by reference. Stepwise regression with a 95% confidence level can be used with the digital values from the TRCs 420 and their combinations as the regression variables and the scanner RGB values from the scanner as the data to be fit. These correction functions 425 often have a dominant linear term indicating the forward model 400 accounts for most of the behavior of the scanner. Accordingly, each correction function 425 receives all the digital values from the TRCs 420 and generates an estimated digital value for the respective R, G, B channel.

The invention may be implemented in hardware or software, or a combination of both. However the invention preferably is implemented in computer programs executing on programmable computers each comprising a processor a data storage system (including volatile and nonvolatile memory and/or storage elements), at least one input device, and at least one output device. Program code is applied to input data to perform the functions described herein and generate output information. The output information is applied to one or more output devices, in known fashion.

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CDROM, or magnetic media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of implementations of the present invention have been described. Nevertheless, it will be understood that various modifications may be made without departing from the spirit and scope of the invention. Additional variations are possible, such as using CMY color space coordinates for the forward model instead of RGB color space coordinates. The filter functions can also be provided or measured directly. The technique is not limited to modeling scanner behavior, but can be applied to other image acquisition devices as well. For example, the invention could also be applied to digital cameras. Accordingly, it is to be understood that the invention is not to be limited by the specific illustrated embodiments, but only by the scope of the appended claims.

What is claimed is:

1. A method of modeling spectral characteristics of an image acquisition device, comprising:

(a) estimating media coordinates in a colorant space of a sample scanned by an image acquisition device, where the estimated media coordinates correspond to target digital values produced by the image acquisition device when scanning the sample;

(b) converting the estimated media coordinates to an estimated spectrum using a basis spectra model corresponding to the sample;

(c) estimating digital values by supplying the estimated spectrum to a forward model which models the image acquisition device;

(d) identifying a digital error between the estimated digital values and the target digital values;

(e) converting the estimated spectrum to estimated color space values;

(f) converting the target digital values to target color space values;

(g) identifying a color space error between the estimated color space values and the target color space values;

(h) combining the digital error with the color space error to identify a composite error; and (i) if a stopping criterion has not been met, searching the colorant space for media coordinates according to the composite error and repeating steps (b) through (i) until the stopping criterion has been met.

2. The method of claim 1, where the image acquisition device is a scanner.

3. The method of claim 1, where the stopping criterion is met if the composite error is within a tolerance.

4. The method of claim 1, where identifying the digital error comprises calculating a Euclidean distance between the estimated digital values and the target digital values.

5. The method of claim 1, where identifying the color space error comprises calculating a Euclidean distance between the estimated color space values and the target color space values.

6. The method of claim 1, where the estimated color space values and the target color space values are L*a*b* values.

7. The method of claim 1, where converting the target digital values to target color space values comprises:

converting the target digital values to target XYZ values using target regression functions; and converting the target XYZ values to target L*a*b* values.

8. The method of claim 1, where said searching the colorant space includes updating the media coordinates according to the composite error.

9. The method of claim 1, where searching the colorant space includes using a numerical minimization technique constrained so as not to identify media coordinates outside bounds defined by the basis spectra model.

10. The method of claim 9, where bounds of the basis spectra model are derived from basis training samples.

11. The method of claim 1, where:

the basis spectra model includes at least one basis vector formed using principal component analysis; and each basis vector has been transformed by varimax rotation.

12. The method of claim 1, where the image acquisition device has at least one output channel, and the forward model comprises, for each output channel of the image acquisition device:

multiplying a sample spectrum supplied to the forward model and a value of a filter function to produce a spectral product, where the value of the filter function represents a product of a filter transmittance spectrum corresponding to a filter of the image acquisition device and an illuminant spectrum corresponding to an illuminant;

integrating the spectral product over at least one wavelength to produce an integral value; and converting the integral value into an estimated digital value by applying a one-dimensional transformation function to the integral value.

13. The method of claim 12, where the spectral product is integrated over the visible wavelengths.

14. The method of claim 12, further comprising:

applying a multidimensional regression function to the estimated digital values to model channel interaction in the image acquisition device.

15. The method of claim 12, where the one-dimensional transformation function is a gain-offset-gamma function.

16. The method of claim 15, further comprising estimating parameters of the gain-offset-gamma function, where such estimation comprises:

scanning a flat spectra target to produce flat sample values, where the flat spectra target includes a neutral color wedge such that spectra are substantially constant at each visible wavelength;

measuring flat sample spectra of the flat spectra target; and estimating gain, offset, and gamma parameters based upon the flat sample values and the flat sample spectra using a constrained minimization technique.

17. The method of claim 12, further comprising estimating filter parameters of the filter function, where such estimation comprises:

scanning a multicolor target to produce multicolor sample values, where the multicolor target includes colors spanning a gamut of a printing device which produced the multicolor target;

measuring multicolor sample spectra of the multicolor target;

estimating filter parameters of the filter function based upon the multicolor sample values and the multicolor sample spectra using a constrained minimization technique;

calculating filter digital values by applying the forward model to the multicolor spectra using the estimated filter functions;

calculating a filter difference by comparing the filter digital values to the multicolor sample values; and if a filter stopping criterion has not been met, re-estimating the filter parameters based on the filter difference and repeating the steps of calculating filter digital values, calculating the filter difference, and re-estimating the filter parameters until the filter stopping criterion has been met.

18. The method of claim 17, where the filter stopping criterion is met if the filter difference is within a filter tolerance.

19. The method of claim 17, where:

the filter functions are Gaussian functions; and the filter parameters include mean, standard deviation, and amplitude.

20. The method of claim 17, where the one-dimensional transformation function is a gain-offset-gamma function, and the method further comprises:

estimating gain-offset-gamma parameters for the gain-offset-gamma function;

calculating construction digital values using the gain-offset-gamma function and filter function with the respective estimated parameters;

calculating a construction difference based on the construction digital values and the multicolor sample values; and if a convergence criterion has not been met, re-estimating the gain-offset-gamma parameters and the filter parameters until the convergence criterion is met.

21. The method of claim 20, where the convergence criterion is met if the construction difference is within a construction tolerance.

22. The method of claim 19, where estimating gain-offset-gamma parameters comprises:

scanning a flat spectra target to produce flat sample values, where the flat spectra target includes a neutral color wedge such that spectra are substantially constant at each visible wavelength;

measuring flat sample spectra of the flat spectra target; and estimating gain, offset, and gamma parameters based upon the flat sample values and the flat sample spectra using a constrained minimization technique.

23. The method of claim 12, where the one-dimensional transformation function is a gain-offset-gamma function, and the method further comprises:

scanning a flat spectra target to produce flat sample values, where the flat spectra target includes a neutral color wedge such that spectra are substantially constant at each visible wavelength;

measuring flat sample spectra of the flat spectra target;

scanning a multicolor target to produce multicolor sample values, where the multicolor target includes colors spanning a gamut of a printing device which produced the multicolor target;

measuring multicolor sample spectra of the multicolor target;

determining flat average values based on the flat sample values;

estimating gain-offset-gamma parameters for the gain-offset-gamma function based on the flat average values using constrained minimization;

estimating filter parameters for the filter functions based on the multicolor sample values and the multicolor sample spectra using constrained minimization;

re-estimating the gain-offset-gamma parameters using the flat sample spectra;

re-estimating the filter parameters using the re-estimated gain-offset-gamma functions;

calculating construction digital values using the gain-offset-gamma function and filter function with the respective re-estimated parameters based on the multicolor-sample spectra;

calculating a construction difference based on the construction digital values and the multicolor sample values; and if a convergence criterion has not been met, re-estimating the gain-offset-gamma parameters and the filter parameters until the convergence criterion is met.

24. The method of claim 1, where the image acquisition device has at least one output channel, and the forward model comprises, for each output channel of the image acquisition device:

multiplying a sample spectrum supplied to the forward model and an illuminant spectrum corresponding to an illuminant to produce a first spectral product;

multiplying the first spectral product by a filter transmittance spectrum corresponding to a filter of the image acquisition device to produce a second spectral product;

integrating the second spectral product over at least one wavelength to produce an integral value; and converting the integral value into an estimated digital value by applying a one-dimensional transformation function to the integral value.

25. The method of claim 23, further comprising applying a multidimensional regression function to the estimated digital values.

26. The method of claim 23, where the one-dimensional transformation function is a gain-offset-gamma function.

27. A method of modeling spectral characteristics of an image acquisition device, comprising:

(a) estimating media coordinates in a colorant space of a sample scanned by an image acquisition device, where the estimated media coordinates correspond to target digital values produced by the image acquisition device when scanning the sample;

(b) converting the estimated media coordinates to an estimated spectrum using a basis spectra model corresponding to the sample;

(c) estimating digital values by supplying the estimated spectrum to a forward model which models the image acquisition device, where the forward model includes applying multidimensional regression functions to produce the estimated digital values;

(d) identifying a digital error between the estimated digital values and the target digital values;

(e) converting the estimated spectrum to estimated color space values;

(f) converting the target digital values to target color space values;

(g) identifying a color space error between the estimated color space values and the target color space values;

(h) combining the digital error with the color space error to identify a composite error;

(i) if a stopping criterion has not been met, searching the colorant space for media coordinates according to the composite error and repeating steps (b) through (i) until the stopping criterion has been met.

28. A method of modeling spectral characteristics of an image acquisition device, comprising:

(a) estimating media coordinates in a colorant space of a sample scanned by an image acquisition device, where the estimated media coordinates correspond to target digital values produced by the image acquisition device when scanning the sample;

(b) converting the estimated media coordinates to an estimated spectrum using a basis spectra model corresponding to the sample;

(c) estimating digital values by supplying the estimated spectrum to a forward model which models the image acquisition device;

(d) identifying a digital error between the estimated digital values and the target digital values; and (i) if a stopping criterion has not been met, searching the colorant space for media coordinates according to the digital error using a constrained minimization technique and repeating steps (b) through (i) until the stopping criterion has been met.

29. A method of modeling spectral characteristics of an image acquisition device, comprising:

(a) estimating media coordinates in a colorant space of a sample scanned by an image acquisition device, where the estimated media coordinates correspond to target digital values produced by the image acquisition device when scanning the sample;

(b) converting the estimated media coordinates to an estimated spectrum using a basis spectra model corresponding to the sample, where the basis spectra model includes at least one basis vector formed using principal component analysis and each basis vector has been transformed by varimax rotation;

(c) estimating digital values by supplying the estimated spectrum to a forward model which models the image acquisition device;

(d) identifying a digital error between the estimated digital values and the target digital values; and (i) if a stopping criterion has not been met, searching the colorant space for media coordinates according to the digital error and repeating steps (b) through (i) until the stopping criterion has been met.

30. A method of modeling spectral characteristics of an image acquisition device, comprising:

(a) estimating media coordinates in a colorant space of a sample scanned by an image acquisition device, where the estimated media coordinates correspond to target digital values produced by the image acquisition device when scanning the sample;

(b) converting the estimated media coordinates to an estimated spectrum using a basis spectra model corresponding to the sample, where bounds of the basis spectra model are derived from basis training samples;

(c) estimating digital values by supplying the estimated spectrum to a forward model which models the image acquisition device;

(d) identifying a digital error between the estimated digital values and the target digital values; and (i) if a stopping criterion has not been met, searching the colorant space for media coordinates according to the digital error and repeating steps (b) through (i) until the stopping criterion has been met.

31. A method of modeling spectral characteristics of an image acquisition device, comprising:

iteratively updating media coordinates corresponding to an estimated spectrum until a stopping criterion is met, where the media coordinates are in a colorant space of a sample scanned by an image acquisition device; and constraining said updating using a basis spectra model corresponding to the sample with a constrained minimization process.

32. The method of claim 30, where the image acquisition device is a scanner.

33. The method of claim 30, where the stopping criterion is met when a composite error is within a tolerance, where the composite error is generated by comparing estimated digital values generated by a forward model of the image acquisition device to target digital values generated by the image acquisition device, and comparing estimated color space values based on the estimated spectrum to target color space values based on the target digital values.

34. The method of claim 30, where:

the basis spectra model constrains the search based on bounds derived from basis training samples.

35. The method of claim 30, where:

the basis spectra model includes at least one basis vector; and each basis vector is transformed by varimax rotation.

36. The method of claim 30, further comprising:

estimating parameters for the forward model using targets scanned by the image acquisition device.

37. The method of claim 30, further comprising:
iteratively estimating parameters for the forward model using targets scanned by the image acquisition device until a forward model stopping criterion is met.

38. The method of claim 36, where the forward model stopping criterion is met when a forward model error is within a forward model tolerance.

39. The method of claim 30, where:
the forward model includes multidimensional regression functions to model channel interaction in the image acquisition device.

40. A computer program, residing on a computer-readable medium, for modeling spectral characteristics of an image acquisition device, the computer program comprising instructions for causing a computer to:
(a) estimate media coordinates in a colorant space of a sample scanned by an image acquisition device, where the estimated media coordinates correspond to target digital values produced by the image acquisition device when scanning the sample;
(b) convert the estimated media coordinates to an estimated spectrum using a basis spectra model corresponding to the sample;
(c) estimate digital values by supplying the estimated spectrum to a forward model which models the image acquisition device;
(d) identify a digital error between the estimated digital values and the target digital values;
(e) convert the estimated spectrum to estimated color space values;
(f) convert the target digital values to target color space values;
(g) identify a color space error between the estimated color space values and the target color space values;
(h) combine the digital error with the color space error to identify a composite error; and
(i) when a stopping criterion has not been met, search the colorant space for, media coordinates according to the composite error and repeat steps (b) through (i) until the stopping criterion has been met.

41. In a computer system, a scanner model for modeling spectral characteristics of an image acquisition device, comprising:
(a) means for estimating media coordinates in a colorant space of a sample scanned by an image acquisition device, where the estimated media coordinates correspond to target digital values produced by the image acquisition device when scanning the sample;
(b) means for converting the estimated media coordinates to an estimated spectrum using a basis spectra model corresponding to the sample;
(c) means for estimating digital values by supplying the estimated spectrum to a forward model which models the image acquisition device;
(d) means for identifying a digital error between the estimated digital values and the target digital values;
(e) means for converting the estimated spectrum to estimated color space values;
(f) means for converting the target digital values to target color space values;
(g) means for identifying a color space error between the estimated color space values and the target color space values;
(h) means for combining the digital error with the color space error to identify a composite error; and
(i) means for searching the colorant space for media coordinates according to the composite error and repeating steps (b) through (i) until a stopping criterion has been met.

* * * * *

UNITED STATES PATENT AND TRADEMARK OFFICE
CERTIFICATE OF CORRECTION

PATENT NO.   : 6,654,150 B1
DATED         : November 25, 2003
INVENTOR(S)  : William A. Rozzi It is certified that error appears in the above-identified patent and that said Letters Patent is hereby corrected as shown below:

Column 7,
Line 17, "$g = \int S(\lambda)R(\lambda)I(\lambda)d\lambda$" should read -- $g = \int S(\lambda)G(\lambda)I(\lambda)d\lambda$ --
Line 19, "$b = \int S(\lambda)R(\lambda)I(\lambda)d\lambda$" should read -- $b = \int S(\lambda)B(\lambda)I(\lambda)d\lambda$ --

Column 9,
Line 49, after the word "construction", delete the word "in".

Signed and Sealed this

Twenty-sixth Day of July, 2005

JON W. DUDAS
*Director of the United States Patent and Trademark Office*